United States Patent
Jayachandran et al.

(10) Patent No.: US 10,169,347 B2
(45) Date of Patent: Jan. 1, 2019

(54) LAYER IDENTIFICATION AND DEPENDENCY ANALYSIS FOR MANAGEMENT OF IMAGES

(71) Applicant: International Business Machines Corporation, Armonk, NY (US)

(72) Inventors: Praveen Jayachandran, New Delhi (IN); Vijay Mann, New Delhi (IN); Shripad J. Nadgowda, New Delhi (IN); Mudit Verma, Roorkee (IN)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 14/847,622

(22) Filed: Sep. 8, 2015

(65) Prior Publication Data

US 2017/0068676 A1    Mar. 9, 2017

(51) Int. Cl.
    *G06F 17/30*      (2006.01)

(52) U.S. Cl.
    CPC .... *G06F 17/30085* (2013.01); *G06F 17/3028* (2013.01); *G06F 17/30076* (2013.01)

(58) Field of Classification Search
    CPC ......... G06F 17/30569; G06F 17/30067; G06F 17/30286
    USPC ........ 707/756, 694, 602, 785, 736; 715/758, 715/751, 764
    See application file for complete search history.

(56) References Cited

U.S. PATENT DOCUMENTS 8,261,254 B2    9/2012    Cook
8,838,555 B2 *   9/2014    von Kaenel ...... G06F 17/30241
                                                        340/990
2002/0049847 A1 *   4/2002   McArdle ................ G06Q 10/10
                                                        709/227
2004/0117358 A1 *   6/2004   von Kaenel ...... G06F 17/30241
2005/0097440 A1 *   5/2005   Lusk ..................... G06Q 10/10
                                                        715/758

(Continued)

OTHER PUBLICATIONS

Dunagan et al., "Towards a self-managing software patching process using black-box persistent-state manifests", Microsoft Research, ICAC 2004.

(Continued)

*Primary Examiner* — Jeff A Burke
*Assistant Examiner* — Thong H Vu
(74) *Attorney, Agent, or Firm* — Ryan, Mason & Lewis, LLP

(57) ABSTRACT

Methods, systems, and computer program products for software identification, dependency analysis, and manipulation of file system layers of container images are provided herein. A computer-implemented method includes extracting multiple layer files from an input image; identifying software components in each of the extracted layer files; manipulating the input image based on said identifying and user-defined parameters, wherein said manipulating comprises (i) selecting a sub-set of the layer files for retention, (ii) removing a sub-set of the layer files, and (iii) modifying one or more of the layer files selected for retention and/or inserting one or more new layer files in place of one or more of the removed layer files; and outputting a modified version of the input image that includes the sub-set of the multiple layer files selected for retention and any new layer files inserted in place of removed layer files.

18 Claims, 4 Drawing Sheets

(56) References Cited

U.S. PATENT DOCUMENTS

| | | | | |
|---|---|---|---|---|
| 2006/0161928 | A1* | 7/2006 | Douglass | G11B 17/225 720/600 |
| 2007/0240217 | A1* | 10/2007 | Tuvell | G06F 21/56 726/24 |
| 2009/0106234 | A1* | 4/2009 | Siedlecki | G06F 17/30864 |
| 2010/0281083 | A1 | 11/2010 | Purtell, II et al. | |
| 2011/0270833 | A1* | 11/2011 | Von Kaenel | G06F 17/30241 707/736 |
| 2012/0054095 | A1* | 3/2012 | Lesandro | G06Q 20/10 705/39 |
| 2012/0156668 | A1* | 6/2012 | Zelin | G09B 5/12 434/362 |
| 2016/0077947 | A1 | 3/2016 | Basu et al. | |

OTHER PUBLICATIONS

GitHub, flatten images—merge multiple layers into a single one, Apr. 4, 2013, https://github.com/docker/docker/issues/332.

\* cited by examiner

LAYER IDENTIFICATION AND DEPENDENCY ANALYSIS FOR MANAGEMENT OF IMAGES

FIELD

The present application generally relates to information technology, and, more particularly, to container image analysis techniques.

BACKGROUND

Generating and managing distributed applications can be carried out via a platform, for example, such as the open source Docker™ platform. Such an example platform can include thousands of public container images in its image repository, wherein each image can be organized as a sequence of file system layers. However, a user of a container image from such a platform has no recourse but to trust the developer's name and description of the image for what the image contains. In using such existing platforms, verification prior to downloading the image is not currently possible.

Additionally, given an image with many applications and/or components installed (each in one or more layers), it is currently not possible to extract a select set of components to create a leaner modified image. In such an instance, a user would have to rebuild a new image from scratch with the required components. Also, applying a patch or update to a particular software component has to be implemented as a new layer, or the user would have to rebuild a new image from scratch.

SUMMARY

In one aspect of the present invention, techniques for software identification, dependency analysis, and manipulation of file system layers of container images to facilitate their management are provided. An exemplary computer-implemented method can include steps of extracting multiple layer files from an input image; identifying one or more software components in each of the multiple extracted layer files; manipulating the input image based on said identifying and one or more user-defined parameters, wherein said manipulating comprises (i) selecting a sub-set of one or more of the multiple layer files for retention, (ii) removing a sub-set of one or more of the multiple layer files, and (iii) modifying one or more of the layer files selected for retention and/or inserting one or more new layer files in place of one or more of the removed layer files; and outputting a modified version of the input image subsequent to said manipulating, wherein said modified version of the input image includes the sub-set of one or more of the multiple layer files selected for retention and any new layer files inserted in place of one or more of the removed layer files.

In another aspect of the invention, an exemplary computer-implemented method can include steps of extracting multiple layer files from an input image, and identifying one or more software components in each of the multiple extracted layer files. Such a method can also include determining a version identifier associated with each of the one or more software components identified in each of the multiple extracted layer files. Additionally, such a method can include manipulating the input image based on (i) the identifying step, (ii) the determining step, and (iii) one or more user-defined parameters, wherein manipulating comprises: selecting a sub-set of one or more of the multiple layer files for retention; removing a sub-set of one or more of the multiple layer files; and modifying one or more of the layer files selected for retention and/or inserting one or more new layer files in place of one or more of the removed layer files. Such a method can further include outputting a modified version of the input image subsequent to said manipulating, wherein said modified version of the input image includes the sub-set of one or more of the multiple layer files selected for retention and any new layer files inserted in place of one or more of the removed layer files.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
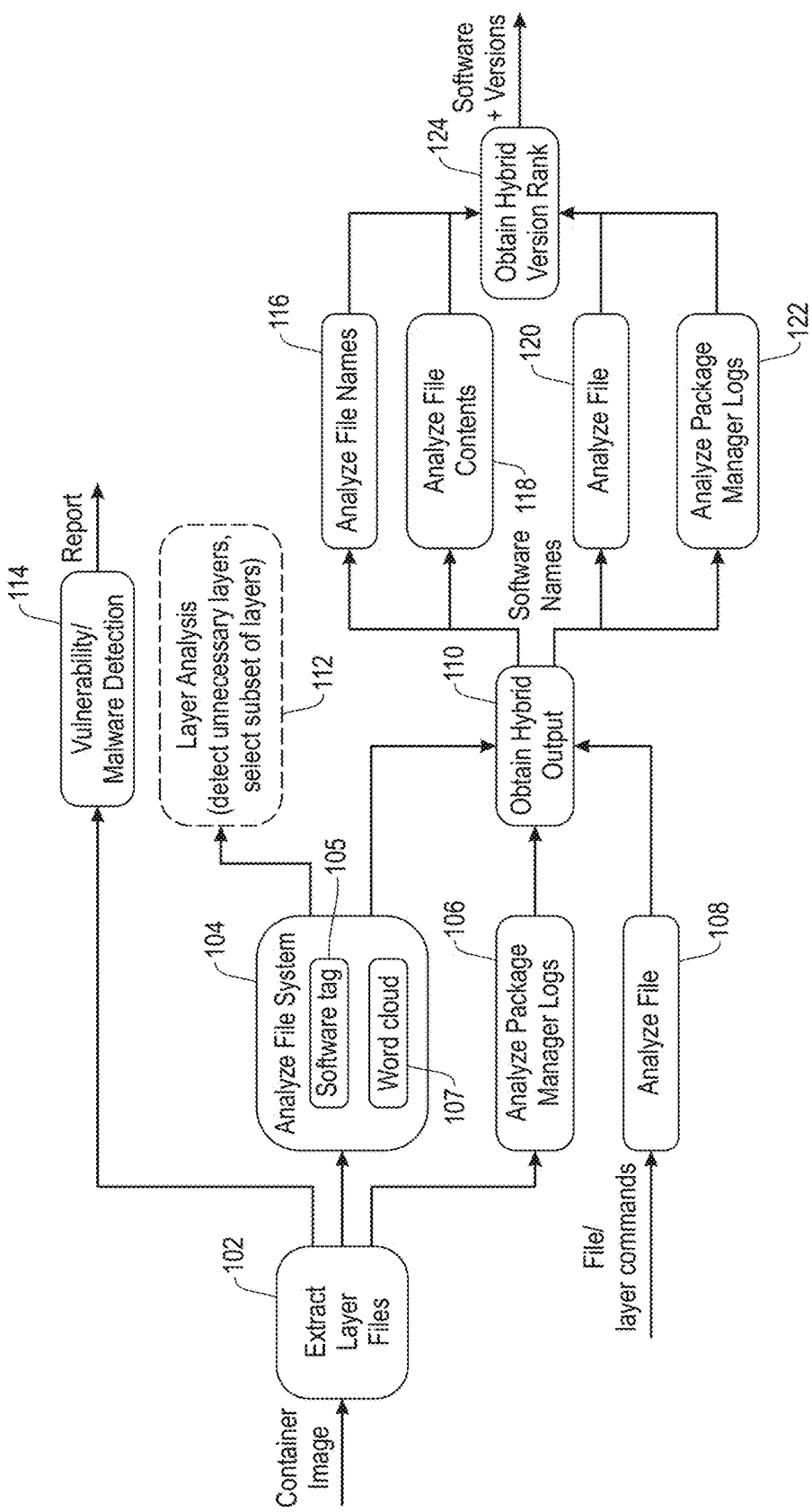
FIG. 1 is a diagram illustrating an image analysis workflow, according to an embodiment of the invention.

As described herein, an aspect of the present invention includes software identification, dependency analysis, and manipulation of file system layers of container images to facilitate their management. Also, one or more example embodiments of the invention are described in connection with the open source Docker™ platform. However, it is to be appreciated by one skilled in the art that Docker™ is merely one example platform, and one or more embodiments of the invention can be implemented in connection with any image based on a layered file system with copy on write.

As noted above, images in a containerization platform repository are often poorly tagged and include limited information on what software an image contains, information pertaining to the corresponding operating system (OS), as well as any software version details. This makes it difficult to reuse existing images. Further, a malicious developer can insert malware into an image, which when run by an unsuspecting user could infect portions of a cloud data center, for example. In contrast to existing software discovery tools, at least one embodiment of the invention includes utilizing an offline image from a containerization platform repository, thereby precluding the need for a running system. In one or more embodiments of the invention, an image search service is built on top of an inspection tool to allow users to search for particular sets of software with specific versions. At least one embodiment of the invention can also include scanning images for known malware and/or vulnerabilities prior to a user downloading the image from a repository.

As described herein, an aspect of the invention includes a system of container image analysis (CIA) and a service that can be a part of any container image repository. In connection therewith, one or more embodiments of the invention include optimizing the number of layers of images (such as, for example, Docker™ images) by retaining selected software components and removing unwanted components. Such an embodiment can include identifying and/or visualizing, as well as tagging, each layer in the image along with each of the software components contained therein. A file system layer, as used herein, refers to a set of files and/or directories along with some meta-data information that enables transparently overlaying multiple file system layers to form a single coherent file system. In Docker™, for example, each command used in building a container image creates and documents a file system layer, which in turn fully describes how to recreate the command. A dependency graph (for example, a directed acyclic graph) can be generated between software components across layers in the image based on static analysis of one or more files, dynamic and/or run-time analysis of process dependencies, as well as expert annotations.

By way of illustration, with respect to file and/or static dependency, if Layer X modifies and/or removes files and/or folders in Layer Y, then Layer X depends on Layer Y. Similarly, with respect to process and/or run-time dependencies, if a process executes a file in Layer X which reads/writes a file in Layer Y, then Layer X depends on Layer Y.

Also, at least one embodiment of the invention includes manipulating an image (from a containerization platform repository) to select a subset of layers and/or software components therefrom, or to roll-back unwanted and/or problematic changes, patches and/or updates to one or more of the software components (even if not the most recent).

As detailed herein, an aspect of the invention includes offline analysis of an image. Such offline analysis can include analyzing each layer of an image. For instance, multiple versions of the same software may be present in different layers of the image, an item of software may have been installed in one layer and uninstalled in a second layer, etc. Such situations can lead to larger image sizes than desired by a user. Accordingly, analyzing individual layers can enable a user to build a leaner version of the image for a desired use.

At least one embodiment of the invention also includes analyzing file commands. Where a file (such as a Docker™ file, for example) is available, the file often contains information regarding what a layer contains, as each command in the file commonly pertains to a layer in the image. Even when a file is not available, at least one embodiment of the invention includes analyzing supplemental information (such as a JavaScript Object Notation (JSON) file, for example) that often contains information regarding the command that was executed to create a particular layer.

Additionally, one or more embodiments of the invention include analyzing package manager logs. A package manager (that is, a set of software tools that automates the process of installing, modifying, configuring, and removing software for a given OS) maintain logs of software installed along with the versions of such software. Diffing such logs across multiple layers can facilitate identification of the specific software packages/components that were installed in a particular layer.

Further, in connection with one or more embodiments of the invention, occurrence frequency is a measure of confidence. To improve the confidence in a detected software component, one or more embodiments of the invention include aggregating results from multiple techniques, which can include file system analysis, file analysis, and analyzing package manager logs. In connection with each technique, a principle is applied wherein the more times a software name is detected, the more likely it is that the software name is present. The same principle can also be applied to detecting version numbers; that is, the more times a particular version number is detected in proximity to a software name (in file names, in file contents, in commands, in logs, etc.), the more likely it is that the version is installed in the container image.

FIG. 1 is a diagram illustrating an image analysis workflow, according to an embodiment of the invention. By way of illustration, FIG. 1 depicts an overall workflow of analyzing a container image offline. Step 102 includes extracting the files present in each layer of a container image. In one or more embodiments of the invention, layers that do not have any files added or edited are ignored (for example, layers wherein only files were deleted, an environment variable was set, etc.). If a desired operation includes vulnerability or malware detection, the extracted files are analyzed for vulnerabilities and/or malware in step 114 (as further described herein).

If a desired objective includes analyzing an image (a pre-requisite to image search), there are multiple operations that can be performed in parallel. In one such operation, the file names and the full paths of the files are analyzed. In another such operation, the file or the command used to generate a particular layer is analyzed via step 108 to determine information pertaining to what the layer contains. In yet another such operation, for software components installed using package managers, step 106 includes analyzing the log to assist in identifying not only the components installed, but also the version(s) thereof. At least one embodiment of the invention includes combining these operations to generate a hybrid output in step 110, wherein such an output can include identification of installed software components and the version(s) thereof.

As also illustrated in FIG. 1, step 104 includes analyzing each layer of a container's file system to identify the software components that are installed, without running the container. Accordingly, within step 104, sub-step 105 includes analyzing the container image offline and using pre-defined tags and/or patterns for well-known software to identify such tags and/or patterns in the file names under analysis. A logical expression that combines the presence or absence of multiple such patterns can be used to identify whether a software is installed among a set of files. If the tag and/or pattern for a particular software is identified, the software is marked as present in the layer. Additionally, in one or more embodiments of the invention, such techniques can be extended to support a weighted function wherein different weights are attributed to different patterns.

Further, as depicted in FIG. 1, within step 104, sub-step 107 includes using a word-cloud approach to identify software components. In connection with sub-step 107, a principle is applied wherein software names are likely the most common words occurring among file paths. Accordingly, sub-step 107 includes pre-processing the words in each layer of a container's file system, and constructing a word cloud that counts the frequency of occurrence of each unique word in the file paths. The most frequent words are reported as software names. One or more embodiments of the invention can additionally include implementing optimizations. By way of example, in one such optimization, words that are English dictionary words (and are not well-known software) can be removed. Further, a word W that is another word Z with a suffix attached thereto is merged along with word Z. Further, when software tags are available, at least one embodiment of the invention also includes combining the frequencies of tags pertaining to a software, further improving precision. Subsequent to the implementation of any such optimizations, the most common words are reported as possible software names.

The tag-based approach in sub-step 105 and the word-cloud approach in sub-step 107 are two ways of identifying software. While the tag-based approach is primed with pre-defined knowledge of the software it tries to detect, the word-cloud approach does not require any knowledge or training.

As additionally depicted in FIG. 1, an output from step 104 can lead to layer analysis in step 112 in one or more embodiments of the invention. Such analysis can include detection of unnecessary layers, and selection of sub-sets of layers. By way of further illustration, in an example embodiment of the invention, a user can visualize the various layers of an input image along with the software components present in each layer, as identified by the system (as depicted in step 104 of FIG. 1). The user can then select the specific layers that he or she wants to retain. The system then removes the links to the unwanted layers and overlays the selected layers to create a new (leaner) coherent file system image. Further, in at least one embodiment of the invention, a dependency graph between the layers of an image can be used to ensure that none of the selected layers bear a dependency on one or more of the removed layers, thereby ensuring that the software components selected will perform as expected in the newly created (leaner) image. In one or more embodiments of the invention, a user can remove one or more layers of an image and, in its/their place, insert one or more other layers to create a new coherent file system image. This is useful, for example, to apply patches or upgrade specific software components, wherein a layer with an older version of a software can be removed and a new layer with the updated version of the software can be inserted in its place.

Referring again to FIG. 1, as noted above, step 106 includes analyzing package manager logs. Some package managers dump logs after every operation. By computing the difference in these log files between two successive layers, the exact changes made in a particular layer can be identified. The use of a package manager and the command invoked can also be verified using the command analysis in step 108. While a log routinely contains accurate information, it can be challenging to extract software names and versions thereof from a log due to spurious data also commonly found in log files. For instance, all packages on which a particular software depends, along with the versions thereof, can be listed in a log. When a package is updated, references to the previous version of the package can be generated and/or included in the log.

As also noted above, step 108 includes analyzing a file (such as a Docker™ file, for example), where available. An available file can contain information regarding the composition of an image, as well as the commands that were used to create the layer. As also noted above, even when a file is not made available, commands can be saved and/or recorded in supplemental information, such as a JSON file, along with the image. Additionally, at least one embodiment of the invention includes analyzing the name of the directory (that may have been copied over multiple earlier statements (layers)) to determine a package name. Accordingly, one or more embodiments of the invention include carrying forward context from one layer to the next layer while analyzing the file.

Referring again to FIG. 1, as noted above, step 110 includes generating a hybrid output for software identification by combining the results from step 104, step 106 and step 108 to generate a single report on the software present in each of the layers of the container image. When a particular software is identified by each of step 104, step 106 and step 108, such software is assigned a higher confidence value than software that is identified by only one or two of the noted steps.

Once the software names have been identified (and output via step 110), at least one embodiment of the invention includes employing multiple methods to determine the version for each such software. Referring to FIG. 1, such methods are illustrated via step 116, step 118, step 120 and step 122.

Step 116 includes analyzing all file names, including file paths, which contain the software name to identify patterns of numbers that resemble a version. If a given portion of the files (for example, a pre-determined percentage of the files) with the software name are within a single folder, that folder can be considered to be the installation folder for the software. Step 118 includes analyzing the contents of all files (for example, all ASCII files) within the detected installation folder (and all of the children folders thereof) to detect version numbers in close proximity to occurrences of the software name. Step 120 includes analyzing the file commands to determine whether a version number is part of the command, along with the software name. Further, step 122 includes analyzing the difference between package manager logs of successive layers.

Step 124 includes generating a hybrid version rank output, which can include calculating the frequency of occurrence of different version numbers from each of step 116, step 118, step 120 and step 122. Also, the frequency of occurrence of different version numbers from each of the noted steps can be weighted, and a score can be calculated for each candidate version number. Embodiments of the invention can utilize one of multiple bases for such weighting. One example is to assign a higher weight for occurrences in the installation folder, and to assign lower weights for occurrences in children folders. Another example is to assign a higher weight to the command and package manager log analysis, and to assign a lower weight to version numbers identified from the file analysis (as the former may be more accurate). In at least one embodiment of the invention, the version number that has the highest score is output.

As noted above, step 114 includes vulnerability analysis and malware detection. There are a multitude of checks that can be implemented in connection with step 114. For example, certain enterprises may require certain compliance and audit checks on the images allowed in a private repository. Additionally, a virus scan can be performed, and the container's file system can be examined for malware. By way of example, at least one embodiment of the invention includes utilizing malware detection tools on files in the image for malware detection. Other vulnerabilities can include, for example, a scenario wherein a user sets a simple password for logging-in to the container. Such a container with a simple password could be attacked (for example, by malware) and could bring down the host along with all the other containers running on the host. At least one embodiment of the invention can include extracting the password file, running a utility to determine user passwords that are simple dictionary words and do not meet the strong password criteria set by an enterprise. By way of example, any container images with passwords that can be easily cracked can be precluded from the repository and the user can be prevented from spawning a container from them.

Figure 2:
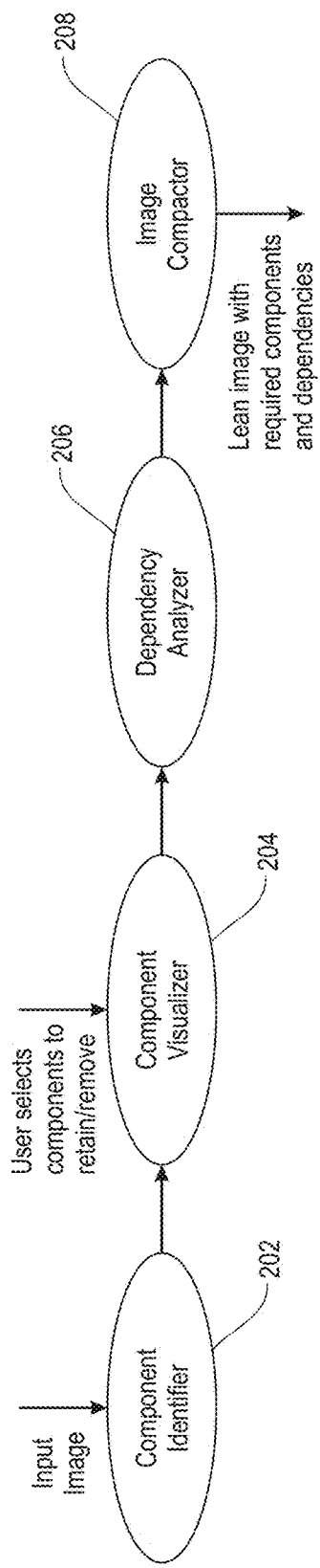
FIG. 2 is a diagram illustrating system architecture, according to an embodiment of the invention.

FIG. 2 is a diagram illustrating system architecture, according to an embodiment of the invention. By way of illustration, FIG. 2 depicts an input image provided to a component identifier 202, which provides input to a component visualizer 204 (which also receives input in the form of a user selecting particular components to retain and/or remove). The component visualizer 204 provides input to a dependency analyzer 206, which provides input to an image compactor 208, which outputs an image (for example, a lean image) that includes required components and dependencies.

The component identifier 202 identifies which software components have been installed on a given image (that is, which software components are present in each layer of the image's file system). Additionally, the component identifier 202 identifies and tags the layer(s) in which each software component is present using one or more data analysis techniques. In one or more embodiments of the invention, the component identifier 202 can map the files in each layer to software components using one or more analysis techniques, as detailed in FIG. 1. When a file or files in a layer do not match any software component, such a layer is marked with a discriminant text based on the most common occurrence in the layer.

Referring again to FIG. 2, the component visualizer 204 enables the user to visualize all of the software components that have been installed on a given image (for example, in chronological fashion).

Additionally, the dependency analyzer 206 identifies any dependencies between software components and generates a dependency graph between layers in the given image. Given a set of selected software components, the dependency analyzer 206 identifies the layers of files on which the components depend. Also, the generated dependency graph (directed acyclic, for example) between layers of the image's file system can include a single root node representing the base image. In at least one embodiment of the invention, a combination of techniques can be implemented to build such a dependency graph.

One such technique includes file and/or folder diffing. For example, Layer X adding, editing and/or removing files and/or folders present in Layer Y represents a direct dependency (an edge from Y to X in a graph). Such an analysis can be repeated for all pairs of layers allowing for transitivity (for example, X depending on Y and Y depending on Z implies that X depends on Z).

Another such technique can include process dependency, which includes running the container with the image to extract which files are read/written by each process, and marking dependencies between layers in which an executable process is present to layers whose files are read/written. Further, yet another such technique includes expert annotation, wherein an expert can annotate dependencies between application components (which can be translated into layer-level dependencies).

Referring again to FIG. 2, the image compactor 208 uses the generated dependency graph to identify one or more layers that need to be retained for the selected software components as well as one or more layers that can be removed. The image compactor 208 additionally creates the final image from the selected layers. In at least one embodiment of the invention, the image compactor 208 selects all layers that contain application components selected by the user, as well as all lower layers on which such layers depend using the dependency graph generated by the dependency analyzer 206. The output final image contains a sub-set of layers representing only the required layers for the selected application component. The sub-set of layers can be loaded as an image.

In another embodiment of the invention, the image compactor 208 can remove one or more layers from an image, and in its/their place, insert one or more new layers. The resultant set of layers is then overlaid to create a coherent file system image. This is useful, for example, to apply a patch or update to a specific software component.

Figure 3:
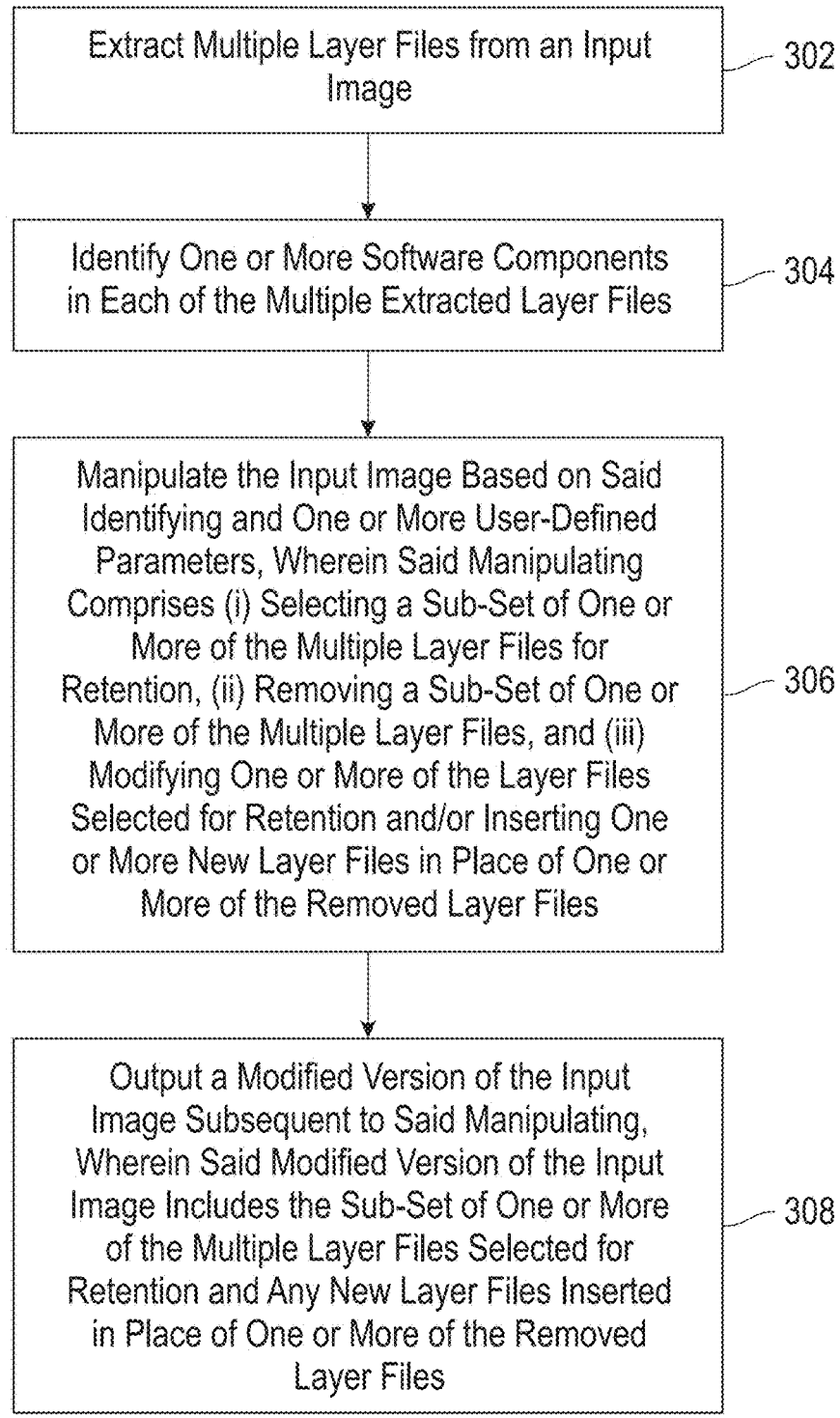
FIG. 3 is a flow diagram illustrating techniques according to an embodiment of the invention.

FIG. 3 is a flow diagram illustrating techniques according to an embodiment of the present invention. Step 302 includes extracting multiple layer files from an input image, wherein said extracting is carried out by at least one computing device. The input image can be selected from a containerization platform repository.

Step 304 includes identifying one or more software components in each of the multiple extracted layer files, wherein said identifying is carried out by the at least one computing device. The identifying step can include a first technique that includes using multiple pre-defined tags and/or multiple pre-defined patterns for one or more known software components to identify one or more of the multiple pre-defined tags and/or one or more of the multiple pre-defined patterns in one or more of the multiple extracted layer files. The identifying step can also include a second technique that includes processing each word in each of the multiple extracted layer file names, constructing a word cloud that measures a frequency of occurrence of each unique word across the multiple extracted layer file names, and identifying a pre-determined number of most frequently used words across the multiple extracted layer file names as software components. Also, the identifying step can include a third technique that includes determining a difference in package manager log files between two successive layer files from the multiple extracted layer files, across all of the multiple extracted layer files. Further, the identifying step can include a fourth technique comprising analyzing each of multiple commands that were used to create each of the multiple extracted layer files.

Also, in connection with the identifying step, at least one embodiment of the invention includes combining (i) a result of the first technique, (ii) a result of the second technique, (iii) a result of the third technique, and (iv) a result of the fourth technique to generate an output identifying the one or more software components in each of the multiple extracted layer files. Combining can include applying a discrete weight to each of (i) the result of the first technique, (ii) the result of the second technique, (iii) the result of the third technique, and (iv) the result of the fourth technique.

In one or more embodiments of the invention, the identifying step can include generating a dependency graph between multiple software components across the multiple extracted layer files. Generating the dependency graph can be based on static analysis of the multiple extracted layer files, run-time analysis of process dependencies across the multiple extracted layer files, and/or expert annotation of one or more dependencies across the multiple extracted layer files.

Step 306 includes manipulating the input image based on said identifying and one or more user-defined parameters, wherein said manipulating comprises (i) selecting a sub-set of one or more of the multiple layer files for retention, (ii) removing a sub-set of one or more of the multiple layer files, and (iii) modifying one or more of the layer files selected for retention and/or inserting one or more new layer files in place of one or more of the removed layer files, wherein said manipulating is carried out by the at least one computing device.

Step 308 includes outputting a modified version of the input image subsequent to said manipulating, wherein said modified version of the input image includes the sub-set of one or more of the multiple layer files selected for retention and any new layer files inserted in place of one or more of the removed layer files, wherein said outputting is carried out by the at least one computing device.

In at least one embodiment of the invention, (i) the extracting step, (ii) the identifying step, (iii) the manipulating step, and (iv) the outputting step are carried out offline. Additionally, the techniques depicted in FIG. 3 can include displaying the one or more software components identified in each of the multiple extracted layer files. Displaying can include displaying the one or more software components identified in each of the multiple extracted layer files in chronological fashion. Also, such an embodiment of the invention can include enabling a user to carry out said manipulating subsequent to said displaying.

Also, the techniques depicted in FIG. 3 can additionally include analyzing each of the one or more software components identified in each of the multiple extracted layer files for one or more pre-determined vulnerabilities, as well as analyzing each of the one or more software components identified in each of the multiple extracted layer files for the presence of malware.

Also, an additional embodiment of the invention includes steps of extracting multiple layer files from an input image, wherein the extracting is carried out by at least one computing device, and identifying one or more software components in each of the multiple extracted layer files, wherein the identifying step is carried out by the at least one computing device. Such an embodiment can also include determining a version identifier associated with each of the one or more software components identified in each of the multiple extracted layer files, wherein the determining step is carried out by the at least one computing device. Additionally, such an embodiment can include manipulating the input image based on (i) the identifying step, (ii) the determining step, and (iii) one or more user-defined parameters, wherein the manipulating step is carried out by the at least one computing device, and wherein manipulating comprises: selecting a sub-set of one or more of the multiple layer files for retention; removing a sub-set of one or more of the multiple layer files; and modifying one or more of the layer files selected for retention and/or inserting one or more new layer files in place of one or more of the removed layer files. Such an embodiment can further include outputting a modified version of the input image subsequent to said manipulating, wherein said modified version of the input image includes the sub-set of one or more of the multiple layer files selected for retention and any new layer files inserted in place of one or more of the removed layer files, wherein the outputting step is carried out by the at least one computing device.

In such an embodiment of the invention, the determining step can include a first technique that includes analyzing each of the multiple extracted layer files containing one or more of the identified software components to identify one or more patterns of numbers that match a pattern of numbers associated with the version identifier associated with one or more of the software components. The determining step can also include a second technique that includes analyzing each of the multiple extracted layer files containing one or more of the identified software components to identify a number within a pre-determined proximity to a name of one or more of the software components. Also, the determining step can additionally include a third technique that includes determining a difference in package manager log files between two successive layer files from the multiple extracted layer files, across all of the multiple extracted layer files containing one or more of the identified software components. Further, the determining step includes a fourth technique that includes analyzing each of multiple commands that were used to create each of the multiple extracted layer files containing one or more of the identified software components. Such an embodiment can also include applying a discrete weight to each of (i) a result of the first technique, (ii) a result of the second technique, (iii) a result of the third technique, and (iv) a result of the fourth technique.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
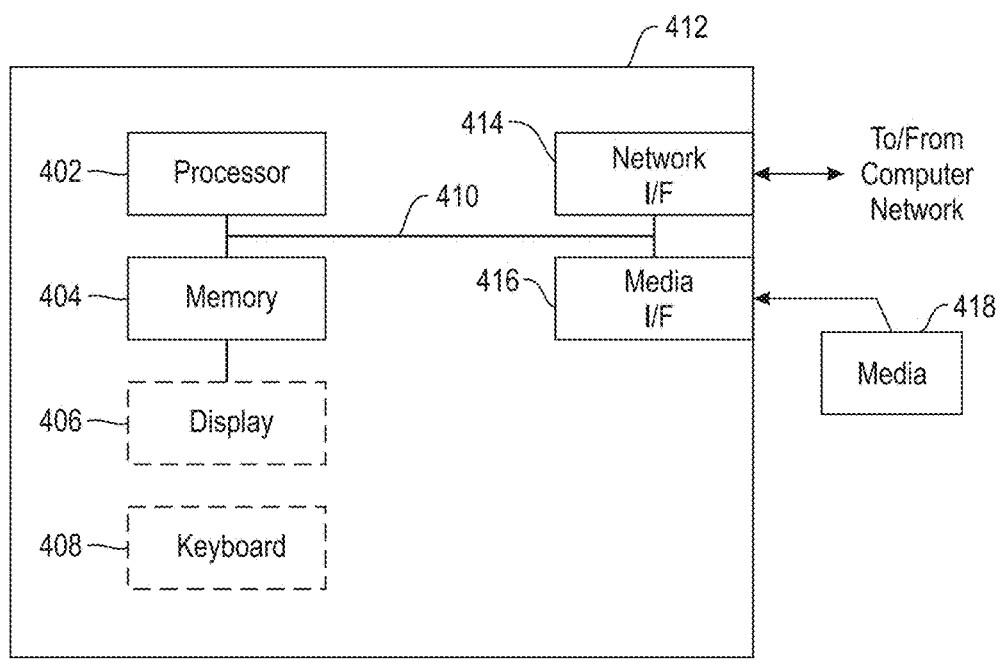
FIG. 4 is a system diagram of an exemplary computer system on which at least one embodiment of the invention can be implemented.

Additionally, an aspect of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit)

and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one aspect of the present invention may provide a beneficial effect such as, for example, analyzing container images offline and identifying the OS and software installed, as well as identifying known malware and vulnerabilities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   extracting multiple layer files from an input image, wherein said input image is selected from a containerization platform repository, and wherein said extracting is carried out by at least one computing device;
   identifying one or more software components in each of the multiple extracted layer files, wherein said identifying is carried out by the at least one computing device, and wherein said identifying comprises a first technique comprising:
      processing each word in each of the multiple extracted layer file names;
      constructing a word cloud that measures a frequency of occurrence of each unique word across the multiple extracted layer file names; and
      identifying a pre-determined number of most frequently used words across the multiple extracted layer file names as software components;
   manipulating the input image based on said identifying and one or more user-defined parameters, wherein said manipulating comprises (i) selecting a sub-set of one or more of the multiple layer files for retention, (ii) removing a sub-set of one or more of the multiple layer files, and (iii) modifying one or more of the layer files selected for retention and/or inserting one or more new layer files in place of one or more of the removed layer files, wherein said manipulating is carried out by the at least one computing device; and
   outputting a modified version of the input image subsequent to said manipulating, wherein said modified version of the input image includes the sub-set of one or more of the multiple layer files selected for retention and any new layer files inserted in place of one or more of the removed layer files, wherein said outputting is carried out by the at least one computing device;

wherein (i) said extracting, (ii) said identifying, (iii) said manipulating, and (iv) said outputting are carried out offline.

2. The method of claim 1, comprising:
displaying the one or more software components identified in each of the multiple extracted layer files.

3. The method of claim 2, wherein said displaying comprises displaying the one or more software components identified in each of the multiple extracted layer files in chronological fashion.

4. The method of claim 2, wherein said manipulating comprises enabling a user to carry out said manipulating subsequent to said displaying.

5. The method of claim 1, wherein said identifying comprises:
a second technique comprising using multiple pre-defined tags and/or multiple pre-defined patterns for one or more known software components to identify one or more of the multiple pre-defined tags and/or one or more of the multiple pre-defined patterns in one or more of the multiple extracted layer files;
a third technique comprising determining a difference in package manager log files between two successive layer files from the multiple extracted layer files, across all of the multiple extracted layer files; and
a fourth technique comprising analyzing each of multiple commands that were used to create each of the multiple extracted layer files.

6. The method of claim 5, comprising:
combining (i) a result of the first technique, (ii) a result of the second technique, (iii) a result of the third technique, and (iv) a result of the fourth technique to generate an output identifying the one or more software components in each of the multiple extracted layer files.

7. The method of claim 6, wherein said combining comprises applying a discrete weight to each of (i) the result of the first technique, (ii) the result of the second technique, (iii) the result of the third technique, and (iv) the result of the fourth technique.

8. The method of claim 1, wherein said identifying comprises generating a dependency graph between multiple software components across the multiple extracted layer files.

9. The method of claim 8, wherein said generating the dependency graph is based on static analysis of the multiple extracted layer files.

10. The method of claim 8, wherein said generating the dependency graph is based on run-time analysis of process dependencies across the multiple extracted layer files.

11. The method of claim 8, wherein said generating the dependency graph is based on expert annotation of one or more dependencies across the multiple extracted layer files.

12. The method of claim 1, comprising:
analyzing each of the one or more software components identified in each of the multiple extracted layer files for one or more pre-determined vulnerabilities.

13. The method of claim 1, comprising:
analyzing each of the one or more software components identified in each of the multiple extracted layer files for the presence of malware.

14. A computer program product, the computer program product comprising a computer readable storage medium having program instructions embodied therewith, the program instructions executable by a device to cause the device to:
extract multiple layer files from an input image, wherein said input image is selected from a containerization platform repository;
identify one or more software components in each of the multiple extracted layer files, wherein said identifying is carried out by the at least one computing device, and wherein said identifying comprises a first technique comprising:
processing each word in each of the multiple extracted layer file names;
constructing a word cloud that measures a frequency of occurrence of each unique word across the multiple extracted layer file names; and
identifying a pre-determined number of most frequently used words across the multiple extracted layer file names as software components;
manipulate the input image based on said identifying and one or more user-defined parameters, wherein said manipulating comprises (i) selecting a sub-set of one or more of the multiple layer files for retention, (ii) removing a sub-set of one or more of the multiple layer files, and (iii) modifying one or more of the layer files selected for retention and/or inserting one or more new layer files in place of one or more of the removed layer files; and
output a modified version of the input image subsequent to said manipulating, wherein said modified version of the input image includes the sub-set of one or more of the multiple layer files selected for retention and any new layer files inserted in place of one or more of the removed layer files;
wherein (i) said extracting, (ii) said identifying, (iii) said manipulating, and (iv) said outputting are carried out offline.

15. A system comprising:
a memory; and
at least one processor coupled to the memory and configured for:
extracting multiple layer files from an input image, wherein said input image is selected from a containerization platform repository;
identifying one or more software components in each of the multiple extracted layer files, wherein said identifying is carried out by the at least one computing device, and wherein said identifying comprises a first technique comprising:
processing each word in each of the multiple extracted layer file names;
constructing a word cloud that measures a frequency of occurrence of each unique word across the multiple extracted layer file names; and
identifying a pre-determined number of most frequently used words across the multiple extracted layer file names as software components;
manipulating the input image based on said identifying and one or more user-defined parameters, wherein said manipulating comprises (i) selecting a sub-set of one or more of the multiple layer files for retention, (ii) removing a sub-set of one or more of the multiple layer files, and (iii) modifying one or more of the layer files selected for retention and/or inserting one or more new layer files in place of one or more of the removed layer files; and outputting a modified version of the input image subsequent to said manipulating, wherein said modified version of the input image includes the sub-set of one or more of the multiple layer files selected for retention and any new layer files inserted in place of one or more of the removed layer files;

wherein (i) said extracting, (ii) said identifying, (iii) said manipulating, and (iv) said outputting are carried out offline.

16. A computer-implemented method, comprising:

extracting multiple layer files from an input image, wherein said input image is selected from a containerization platform repository, and wherein said extracting is carried out by at least one computing device;

identifying one or more software components in each of the multiple extracted layer files, wherein said identifying is carried out by the at least one computing device, and wherein said identifying comprises:
  processing each word in each of the multiple extracted layer file names;
  constructing a word cloud that measures a frequency of occurrence of each unique word across the multiple extracted layer file names; and
  identifying a pre-determined number of most frequently used words across the multiple extracted layer file names as software components;

determining a version identifier associated with each of the one or more software components identified in each of the multiple extracted layer files, wherein said determining is carried out by the at least one computing device;

manipulating the input image based on (i) said identifying, (ii) said determining, and (iii) one or more user-defined parameters, wherein said manipulating is carried out by the at least one computing device, and wherein said manipulating comprises:
  selecting a sub-set of one or more of the multiple layer files for retention;
  removing a sub-set of one or more of the multiple layer files; and
  modifying one or more of the layer files selected for retention and/or inserting one or more new layer files in place of one or more of the removed layer files; and outputting a modified version of the input image subsequent to said manipulating, wherein said modified version of the input image includes the sub-set of one or more of the multiple layer files selected for retention and any new layer files inserted in place of one or more of the removed layer files, wherein said outputting is carried out by the at least one computing device;

wherein (i) said extracting, (ii) said identifying, (iii) said determining, (iv) said manipulating, and (v) said outputting are carried out offline.

17. The method of claim 16, wherein said determining comprises:
  a first technique comprising analyzing each of the multiple extracted layer files containing one or more of the identified software components to identify one or more patterns of numbers that match a pattern of numbers associated with the version identifier associated with one or more of the software components;
  a second technique comprising analyzing each of the multiple extracted layer files containing one or more of the identified software components to identify a number within a pre-determined proximity to a name of one or more of the software components;
  a third technique comprising determining a difference in package manager log files between two successive layer files from the multiple extracted layer files, across all of the multiple extracted layer files containing one or more of the identified software components; and
  a fourth technique comprising analyzing each of multiple commands that were used to create each of the multiple extracted layer files containing one or more of the identified software components.

18. The method of claim 17, comprising:
applying a discrete weight to each of (i) a result of the first technique, (ii) a result of the second technique, (iii) a result of the third technique, and (iv) a result of the fourth technique.

* * * * *